United States Patent
Jin et al.

(10) Patent No.: US 12,210,461 B2
(45) Date of Patent: Jan. 28, 2025

(54) STORAGE DEVICE CACHING UPDATE TARGET DATA UNIT WHILE ENTERING DOWN-TIME MODE AND OPERATING METHOD OF THE STORAGE DEVICE

(71) Applicant: SK hynix Inc., Gyeonggi-do (KR)

(72) Inventors: Byoung Min Jin, Gyeonggi-do (KR); Ku Ik Kwon, Gyeonggi-do (KR); Gyu Yeul Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 8 days.

(21) Appl. No.: 18/453,313

(22) Filed: Aug. 22, 2023

(65) Prior Publication Data

US 2024/0345740 A1    Oct. 17, 2024

(30) Foreign Application Priority Data

Apr. 11, 2023    (KR) .......... 10-2023-0047195

(51) Int. Cl.
*G06F 12/121* (2016.01)
*G06F 3/06* (2006.01)

(52) U.S. Cl.
CPC .......... *G06F 12/121* (2013.01); *G06F 3/0611* (2013.01); *G06F 3/0647* (2013.01); *G06F 3/0673* (2013.01)

(58) Field of Classification Search
CPC .... G06F 12/121; G06F 3/0611; G06F 3/0647; G06F 3/0673
See application file for complete search history.

(56) References Cited

U.S. PATENT DOCUMENTS

2006/0031651 A1*    2/2006    Nonaka .......... G06F 3/0647
                                                    711/112

FOREIGN PATENT DOCUMENTS

KR    10-2021-0156190 A    12/2021
KR    10-2022-0070951 A    5/2022

* cited by examiner

*Primary Examiner* — Chie Yew
(74) *Attorney, Agent, or Firm* — IP & T GROUP LLP

(57) ABSTRACT

The storage device may receive a condition for a down-time mode from the host. The storage device may cache, when the condition for the down-time mode is determined as satisfied, at least a part of update data units in the update cache. The storage device may process a read command received from the host in the down-time mode based on update data units cached in the update cache.

17 Claims, 11 Drawing Sheets

STORAGE DEVICE CACHING UPDATE TARGET DATA UNIT WHILE ENTERING DOWN-TIME MODE AND OPERATING METHOD OF THE STORAGE DEVICE

CROSS-REFERENCES TO RELATED APPLICATION

The present application claims priority under 35 U.S.C. 119 (a) to Korean patent application number 10-2023-0047195 filed on Apr. 11, 2023, which is incorporated herein by reference in its entirety.

BACKGROUND

1. Technical Field

Various embodiments of the present disclosure generally relate to a storage device which caches update target data unit while entering down-time mode, and operating method of the storage device.

2. Related Art

A storage device is a device which stores data according to a request of an external device such as a computer, a mobile terminal such as a smartphone and a tablet, or the like.

A storage device may include a memory for storing data therein and a controller for controlling the memory. The memory may be a volatile memory or a nonvolatile memory. The controller may receive a command from an external device (i.e., a host), and may execute or control operations for reading, writing or erasing data with respect to the memory included in the storage device, according to the received command.

Part of the data stored in the storage device may be migrated to another storage device according to the request of the host. In order to improve QoS (Quality of Service) provided by the host, the time during which an operation of accessing the migrated data is suspended, that is, down-time needs to be minimized.

SUMMARY

Embodiments of the present disclosure may provide a storage device capable of minimizing down-time in the process of migrating data stored in the storage device to another storage device, and an operating method of the storage device.

In one aspect, embodiments of the present disclosure may provide a storage device including a memory configured to store a plurality of data units, and a controller configured to migrate, in response to a request, target data units from the memory to an external device, the target data units being selected from among the stored data units, receive, during the migration, a condition for a down-time mode, determine update data units, which are updated from among the target data units during the migration, cache, during the migration, at least a part of the update data units in an update cache when the condition is determined as satisfied, and process, with the cached data units, a read request in the down-time mode.

In another aspect, embodiments of the present disclosure may provide a method for operating a storage device including receiving a condition for a down-time mode while migrating target data units from the storage device to an external device, the target data units being selected from among data units stored in the storage device, determining whether the condition for the down-time mode is satisfied, determining update data units, which are updated from among the target data units in response to a request during the migrating, caching at least a part of the update data units in an update cache when the condition is determined as satisfied, and processing, with the cached data units, a read request in the down-time mode.

In another aspect, embodiments of the present disclosure may provide a controller including a memory interface configured to communicate with a memory configured to store therein a plurality of data units; and a control circuit configured to receive information, migrate, in response to the information, target data units from the memory to an external device, the target data units being selected from among the stored data units, cache, in an update cache, at least a part of update data units from among the target data units when a condition for a down-time mode is determined as satisfied according to the information during the migration, and process, with the cached data units, a read request in the down-time mode.

In another aspect, embodiments of the present disclosure may provide a method for operating a controller including migrating data units from a first memory device to a second memory device. The migrating may include caching one or more data units, which are updated among the data units, while a number of the updated data units is less than a threshold, and providing, in response to a read request for one or more of the updated data units, the read-requested data units from among the cached data units.

According to the embodiments of the present disclosure, it is possible to minimize down-time in the process of migrating data stored in the storage device to another storage device.

DETAIL DESCRIPTION

Figure 1:
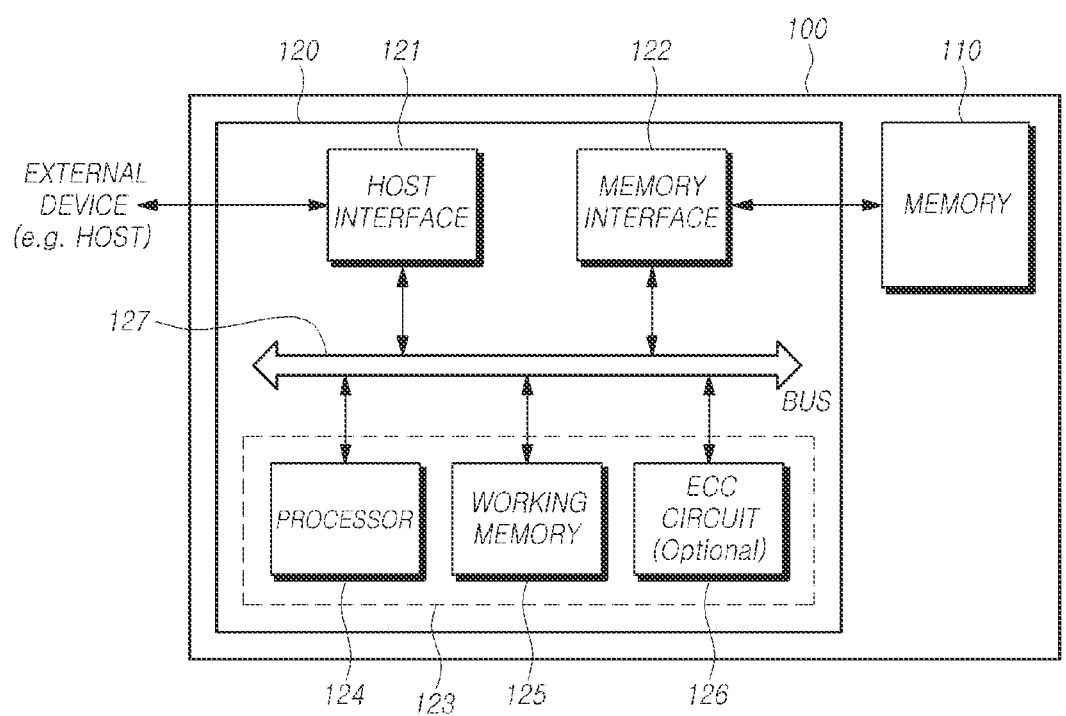
FIG. 1 is a schematic configuration diagram of a storage device according to an embodiment of the present disclosure.

Hereinafter, embodiments of the present disclosure are described in detail with reference to the accompanying drawings. Throughout this specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Since the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 may include a plurality of memory blocks, and operate under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of this disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array, which is selected by the address. The memory 110 may perform an operation instructed by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless of a request from the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience, descriptions will describe the controller 120 and the host as devices that are separated from each other.

Referring to FIG. 1, the controller 120 may include a memory interface 122, a control circuit 123, and a host interface 121.

The host interface 121 may provide an interface for communication with the host. For example, the host interface 121 provides an interface that uses at least one of various communication standards or interfaces such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform the general control operations of the controller 120 to control the operation of the memory 110. To this end, for instance, the control circuit 123 may include a processor 124 and a working memory 125, and may further include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware, which is a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfers the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata used for driving firmware from the memory 110. The metadata which is data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in the last read data. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
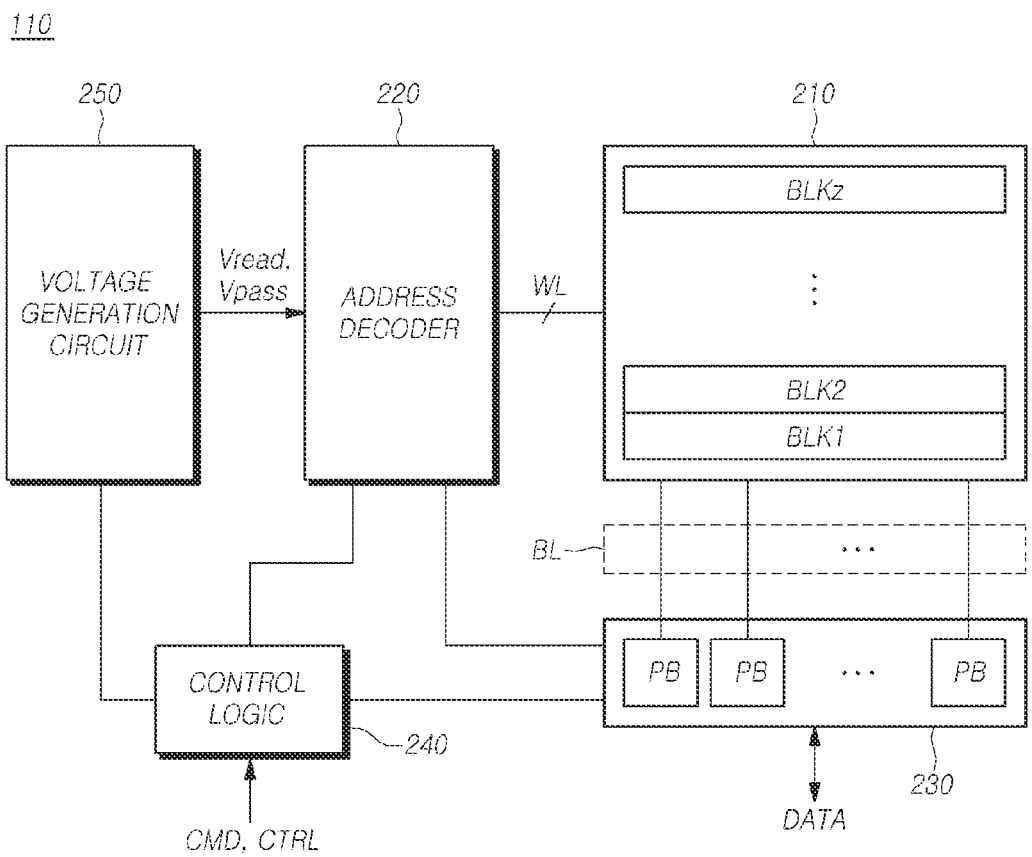
FIG. 2 is a block diagram schematically illustrating a memory of FIG. 1.

FIG. 2 is a block diagram schematically illustrating the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array having a two-dimensional structure or may be configured by a memory cell array having a three-dimensional structure.

Each of the plurality of memory cells included in the memory cell array 210 may store at least 1-bit data. For instance, each of the plurality of memory cells included in the memory cell array 210 may be a single level cell (SLC) capable of storing 1-bit data. In another instance, each of the plurality of memory cells included in the memory cell array 210 may be a multi-level cell (MLC) capable of storing 2-bit data. In still another instance, each of the plurality of memory cells included in the memory cell array 210 may be a triple level cell (TLC) capable of storing 3-bit data. In yet another instance, each of the plurality of memory cells included in the memory cell array 210 may be a quad level cell (QLC) capable of storing 4-bit data. In a further instance, the memory cell array 210 may include a plurality of memory cells, each of which is capable of storing 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 under the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
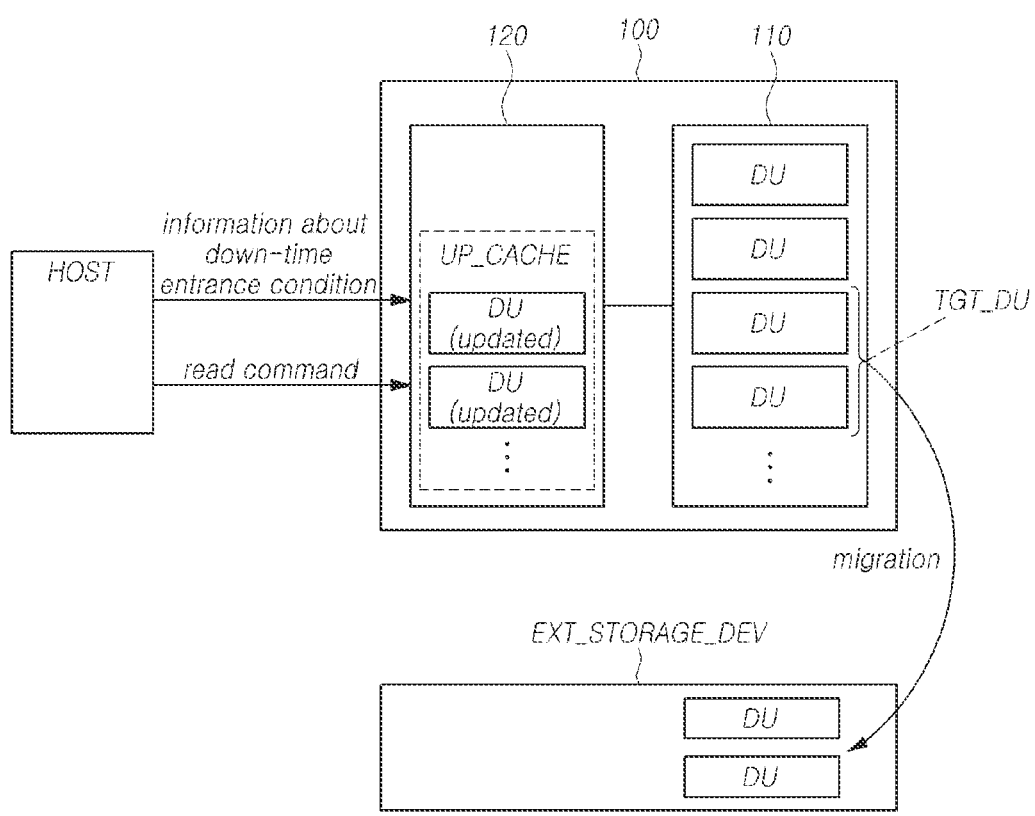
FIG. 3 illustrates schematic structures of a storage device, a host, and an external storage device according to embodiments of the present disclosure.

FIG. 3 illustrates schematic structures of a storage device, a host, and an external storage device according to embodiments of the present disclosure.

Referring to FIG. 3, the storage device 100 may include the memory 110 and the controller 120.

The memory 110 may store a plurality of data units DU. The plurality of data units DU may be stored in the memory 110 by the request from the host. The size of each data unit may be equal to or multiples of a page size. Each data unit may be stored in one of a plurality of memory blocks included in the memory 110.

The controller 120 may receive a condition for entering a down-time mode from the host. The condition for entering the down-time mode may be used to determine whether the controller 120 enters the down-time mode, and may be a policy for determining whether to perform an operation in the down-time mode.

A plurality of target data units TGT_DU among the plurality of data units DU stored in the memory 110 may be migrated to an external storage device EXT_STORAGE_DEV by the request from the host. For example, the controller 120 may receive the condition for entering the down-time mode from the host when the above-described migration starts and may determine the condition for entering the down-time mode during the migration.

Updating the plurality of data units DU stored in the memory 110 may be prohibited in the down-time mode. However, a read operation for the plurality of data units DU stored in the memory 110 may be enabled in the down-time mode. The down-time mode may be referred to as a black-out-time mode.

Update data units may exist among the target data units TGT_DU. The update data units may be data units updated, during the migration of the target data units TGT_DU, by the request from the host among the target data units TGT_DU.

Like the storage device 100, the external storage device EXT_STORAGE_DEV can store a plurality of data units DU.

The controller 120 may manage the update data units so that the host can access the update data units while the update data units are being migrated to the external storage device EXT_STORAGE_DEV.

During the aforementioned migration, the controller 120 may determine whether the condition for entering the down-time mode is satisfied, based on the condition for entering the down-time mode received from the host.

The controller 120 may cache all or part of the update data units in update cache UP_CACHE when it is determined that the condition for entering the down-time mode is satisfied. In this case, update data units to be cached in the update cache UP_CACHE may be update data units that are not yet cached in the update cache UP_CACHE.

The update cache UP_CACHE is a cache capable of temporarily storing the update data units stored in the memory 110. For example, the update cache UP_CACHE may be set as a partial area of the working memory 125 included in the controller 120. As another example, the update cache UP_CACHE may be the same as a cache used to read or write data stored in the memory 110.

In FIG. 3, the case where the update cache UP_CACHE is set inside the controller 120 has been described as an example, but the update cache UP_CACHE may be set on a separate volatile memory (e.g., SRAM, DRAM) existing outside the controller 120.

When the controller 120 receives a read command for the update data units cached in the update cache UP_CACHE from the host, the controller 120 may process the read command based on the update data units cached in the update cache UP_CACHE.

Therefore, the controller 120 performs a read operation based on the update data units cached in the update cache UP_CACHE without accessing the memory 110, so that the controller 120 may process the read command more quickly.

Hereinafter, it will be described in more detail in FIGS. 4 and 5.

Figure 4:
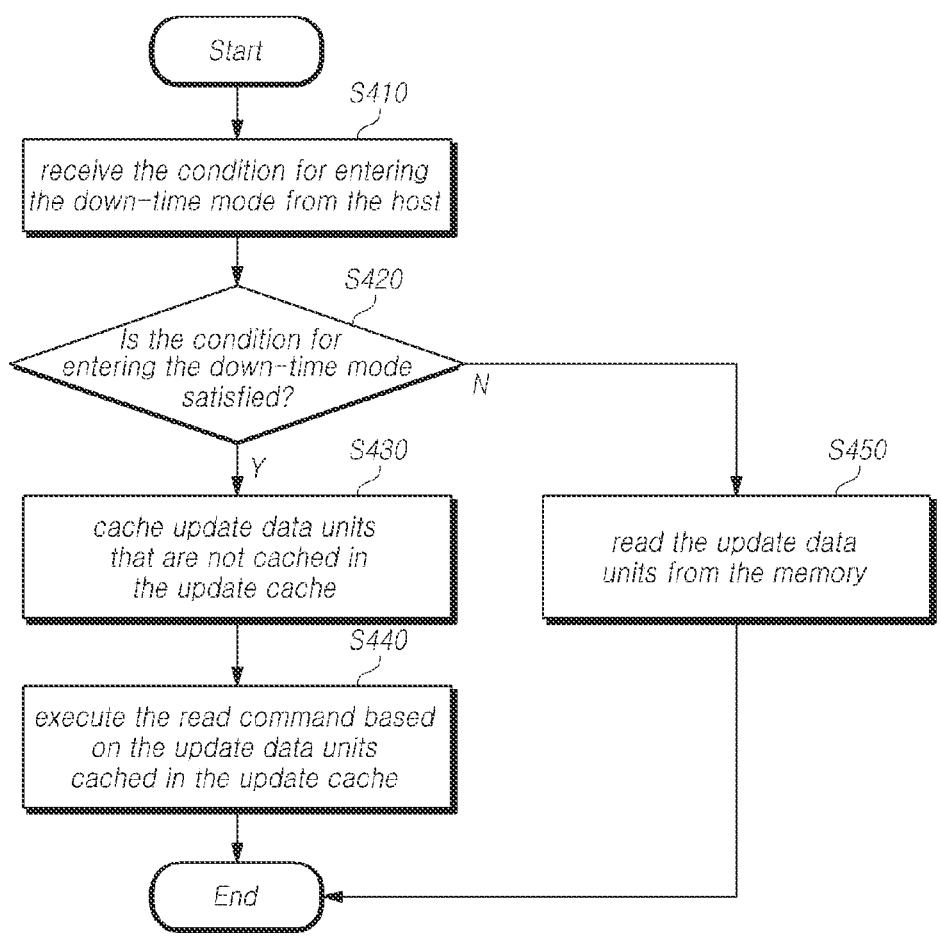
FIG. 4 illustrates an operation of a storage device according to embodiments of the present disclosure.

FIG. 4 illustrates an operation of a storage device according to embodiments of the present disclosure.

Referring to FIG. 4, the controller 120 of the storage device 100 may receive, from the host, the condition for entering the down-time mode (S410).

The controller 120 may determine whether the condition for entering the down-time mode is satisfied while the plurality of target data units are being migrated to the external storage device EXT_STORAGE_DEV (S420).

When it is determined that the condition for entering the down-time mode is satisfied (S420—Y), the controller 120 may cache, in the update cache UP_CACHE, update data units that are not cached in the update cache UP_CACHE (S430).

Then, the controller 20 may process the read command, which is received from the host, based on the update data units cached in the update cache UP_CACHE (S440).

Hereinafter, in FIG. 5, an operation in which the storage device 100 processes the read command based on the update data units cached in the update cache UP_CACHE in operation S440 will be described in detail.

On the other hand, when it is determined that the condition for entering the down-time mode is not satisfied (S420-N), the controller 120 may not cache the update data units in the update cache UP_CACHE.

Accordingly, when receiving the read command for the update data units from the host, the controller 120 may read the update data units from the memory 110 (S450).

Figure 5:
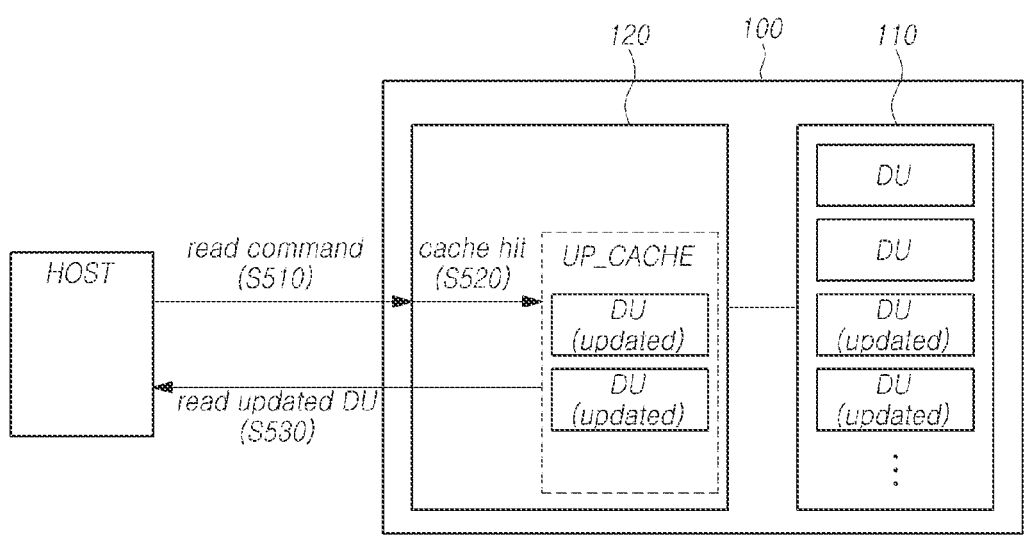
FIG. 5 illustrates an operation in which a storage device processes a read command according to embodiments of the present disclosure.

FIG. 5 illustrates an operation in which a storage device processes a read command according to embodiments of the present disclosure.

Referring to FIG. 5, the controller 120 of the storage device 100 may receive the read command from the host (S510). The read command may request to read all or part of the update data units.

After receiving the read command, the controller 120 may determine whether the update data units requested by the read command are cache-hit, i.e., whether the update data units are cached in the update cache UP_CACHE (S520).

When the update data units requested by the read command are cache-hit, the controller 120 may read, from the update cache UP_CACHE, the update data units requested by the read command and transmit the read update data units to the host (S530).

Through this, the controller 120 may transmit the update data units requested by the read command to the host more quickly. This is because it is not necessary to access the memory 110 to read the update data units requested by the read command.

In the above, the overall operation of the storage device 100 has been described.

Hereinafter, the condition for entering the down-time mode will be described in detail.

Figure 6:
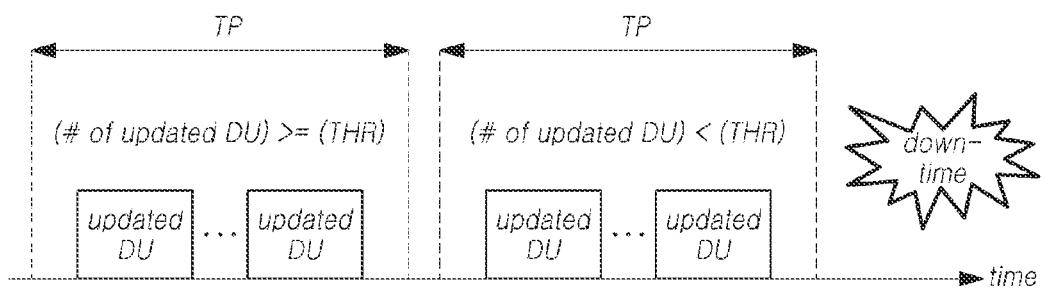
FIG. 6 illustrates an example of a condition for a storage device to enter a down-time mode according to embodiments of the present disclosure.

FIG. 6 illustrates an example of a condition for a storage device to enter a down-time mode according to embodiments of the present disclosure.

Referring to FIG. 6, the controller 120 of the storage device 100 may count a number of update data units generated during a time period TP while migrating the target data units TGT_DU. When the sizes of the plurality of data units DU are the same, the controller 120 may calculate the size of the update data units instead of counting the number of update data units generated during the time period TP. This is because the number of update data units is proportional to the size of the update data units.

The controller 120 may periodically repeat an operation of counting the number of update data units generated during the time period TP while migrating the target data units TGT_DU. The controller 120 may scan a plurality of data units DU for specific time period and count the number of update data units among the plurality of data units DU.

When the number of update data units generated during the time period TP is less than a threshold number THR, the controller 120 may determine that the condition for entering the down-time mode is satisfied. This is because, the time required to migrate the update data units from the storage device 100 to the external storage device EXT_STORAGE_DEV is reduced, the time during which access to the update data units is limited due to integrity of the update data units can be minimized during the down-time mode.

On the other hand, when the sizes of the plurality of data units DU are the same, the controller 120 may determine that the condition for entering the down-time mode is satisfied when the size of the update data units generated during the time period TP is less than a threshold size.

In the above, the condition for the storage device 100 to enter the down-time mode has been described.

Hereinafter, an operation of the storage device 100 managing the update cache UP_CACHE will be described.

Figure 7:
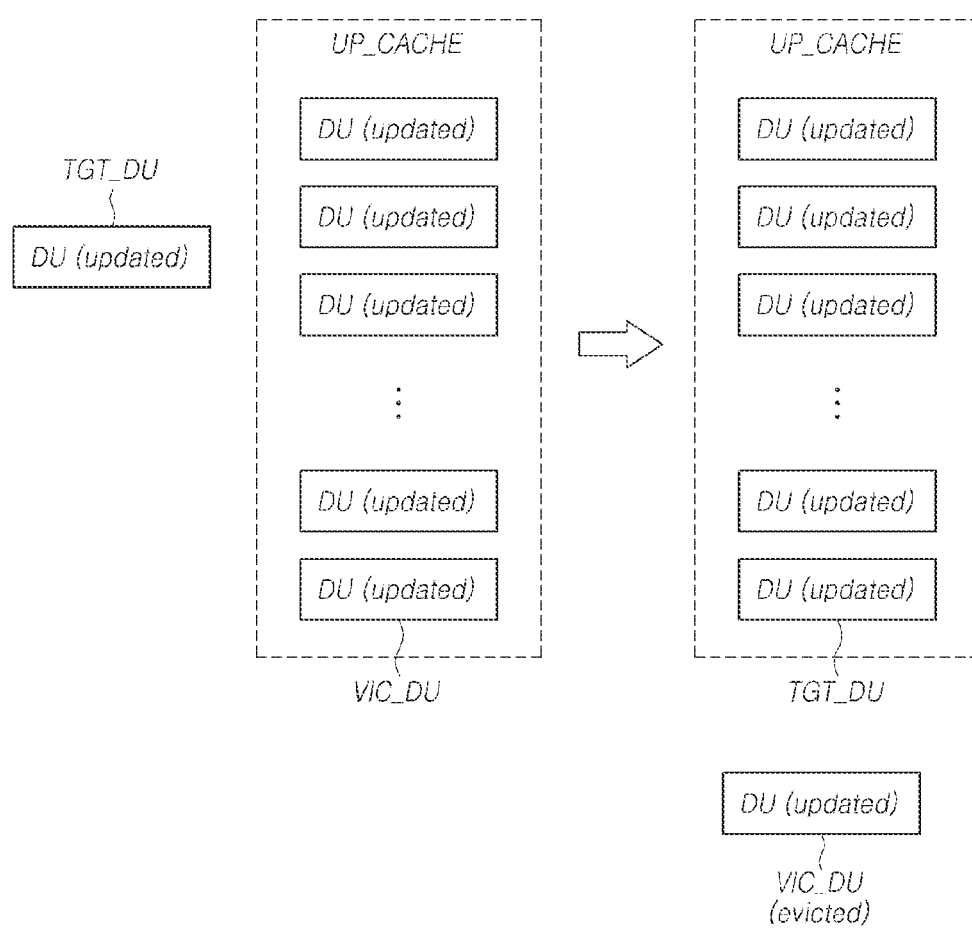
FIG. 7 illustrates an operation in which a storage device evicts a victim data unit from an update cache according to embodiments of the present disclosure.

FIG. 7 illustrates an operation in which the storage device 100 evicts a victim data unit from the update cache UP_CACHE according to embodiments of the present disclosure.

Referring to FIG. 7, the controller 120 of the storage device 100 may evict, from the update cache UP_CACHE, a victim data unit VIC_DU from among the update data units cached in the update cache UP_CACHE while caching, in a state where the update cache UP_CACHE is full, update data units that are not yet cached in the update cache UP_CACHE.

When the update cache UP_CACHE is full, there is no space in the update cache UP_CACHE to additionally cache the update data units TGT_DU that are not yet cached in the update cache UP_CACHE.

Accordingly, the controller 120 may evict, from the update cache UP_CACHE, one of the update data units cached in the update cache UP_CACHE to secure space to additionally cache the update data units TGT_DU that are not yet cached in the update cache UP_CACHE.

Hereinafter, a method (policy) for determining the aforementioned victim data unit VIC_DU will be described.

For example, the controller 120 of the storage device 100 may determine the victim update data unit VIC_DU based on logical addresses corresponding to the update data units cached in the update cache UP_CACHE respectively. Hereinafter, this will be described in detail in FIG. 8.

Figure 8:
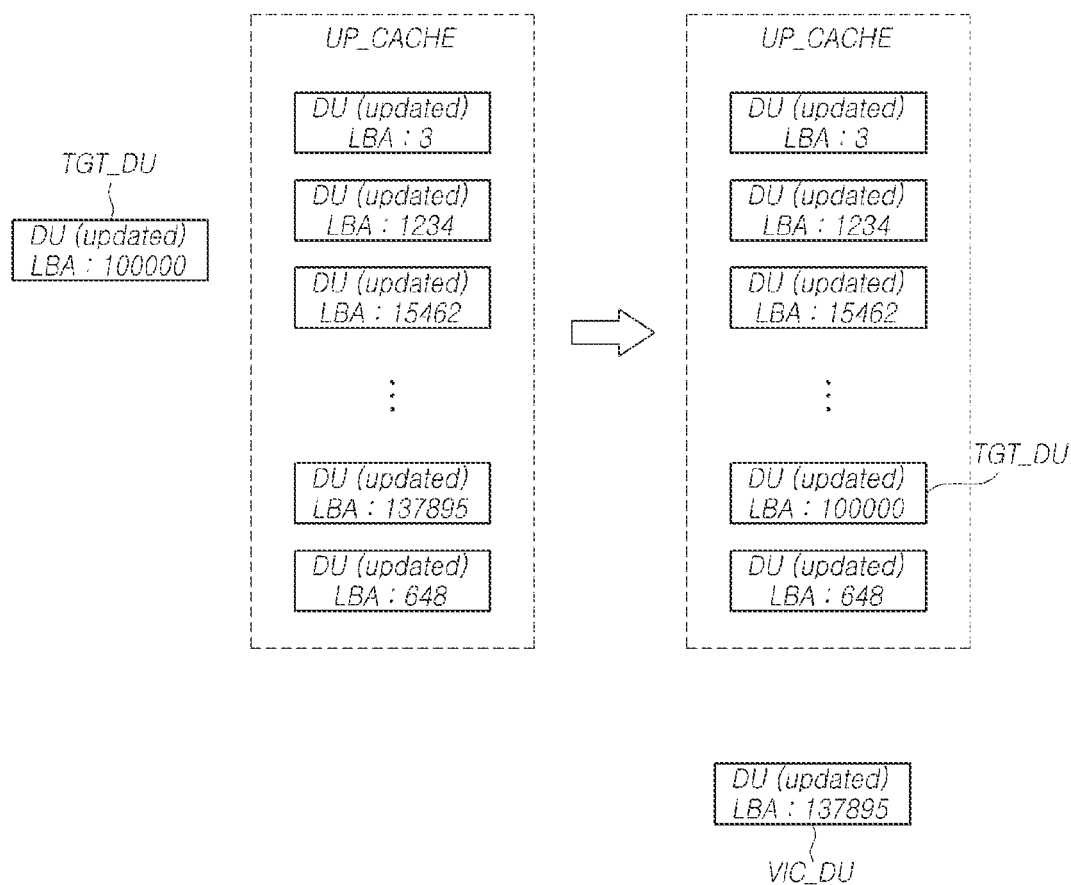
FIG. 8 illustrates an operation in which a storage device determines a victim data unit according to embodiments of the present disclosure.

FIG. 8 illustrates an operation in which the storage device 100 determines the victim data unit VIC_DU according to embodiments of the present disclosure.

In FIG. 8, the update cache UP_CACHE is full, and the logical address corresponding to the update data unit TGT_DU to be additionally cached in the update cache UP_CACHE is 100000.

In this case, the controller 120 may determine, among the update data units cached in the update cache UP_CACHE, a cached data unit having the largest value of the corresponding logical address as the victim data unit VIC_DU.

In FIG. 8, among the update data units cached in the update cache UP_CACHE, the update data unit having the largest value of the corresponding logical address LBA is the update data unit corresponding to logical address 137895.

Accordingly, the controller 120 may determine the update data unit corresponding to the logical address 137895 as the victim data unit VIC_DU and evict it from the update cache UP_CACHE. The controller 120 may cache a new update data unit in the space that was occupied by the update data unit corresponding to the logical address 137895 before.

In FIG. 8, the update data unit having the largest value of the corresponding logical address LBA among the update data units cached in the update cache UP_CACHE is determined as the victim data unit VIC_DU, but the victim data unit VIC_DU may be determined in another way.

For example, the controller 120 may determine, among the update data units cached in the update cache UP_CACHE, a cached data unit having the smallest value of the corresponding logical address as the victim data unit VIC_DU.

As another example, the controller 120 may determine, among the update data units cached in the update cache UP_CACHE, an update data unit having the oldest cached time in the update cached UP_CACHE as the victim data unit VIC_DU.

As another example, the controller 120 may determine, among the update data units cached in the update cache UP_CACHE, an update data unit with the least number of times read by the host as the victim data unit VIC_DU.

A policy of determining the victim data unit VIC_DU may be predetermined in the controller 120 or may be received from the host. The controller 120 may determine the policy of determining the victim data unit VIC_DU through handshaking with the host.

Meanwhile, update data units evicted from the update cache UP_CACHE may be cached again in the update cache UP_CACHE when free space is secured in the update cache UP_CACHE. For example, when some of the update data units cached in the update cache UP_CACHE are migrated to the external storage device EXT_STORAGE_DEV or deleted by the host, free space can be secured in the update cache UP_CACHE since the controller 120 can delete the update data unit migrated to the external storage device EXT_STORAGE_DEV from the update cache UP_CACHE.

In this case, if the update data units previously evicted from the update cache UP_CACHE are cached in the update cache UP_CACHE again, the controller 120 may transmit the update data units to the host more quickly when the host requests to read the update data units.

To this end, the controller 120 of the storage device 100 may manage an update map having information on a history of the update data units. The update map may indicate information about update data units, which are updated among the plurality of data units DU stored in the memory 110, and information about whether the update data units are cached in the update cache UP_CACHE.

Based on the update map, the controller 120 may determine which update data unit is to be cached in the update cache UP_CACHE again when free space is secured in the update cache UP_CACHE.

For example, when N number of the update data units cached in the update cache UP_CACHE are migrated to the external storage device EXT_STORAGE_DEV, the controller 120 may cache M number of the update data units in the update cache UP_CACHE again based on the update map. M may be less than or equal to N. M and N may be natural numbers.

Hereinafter, this will be described in detail in FIGS. 9 to 10.

Figure 9:
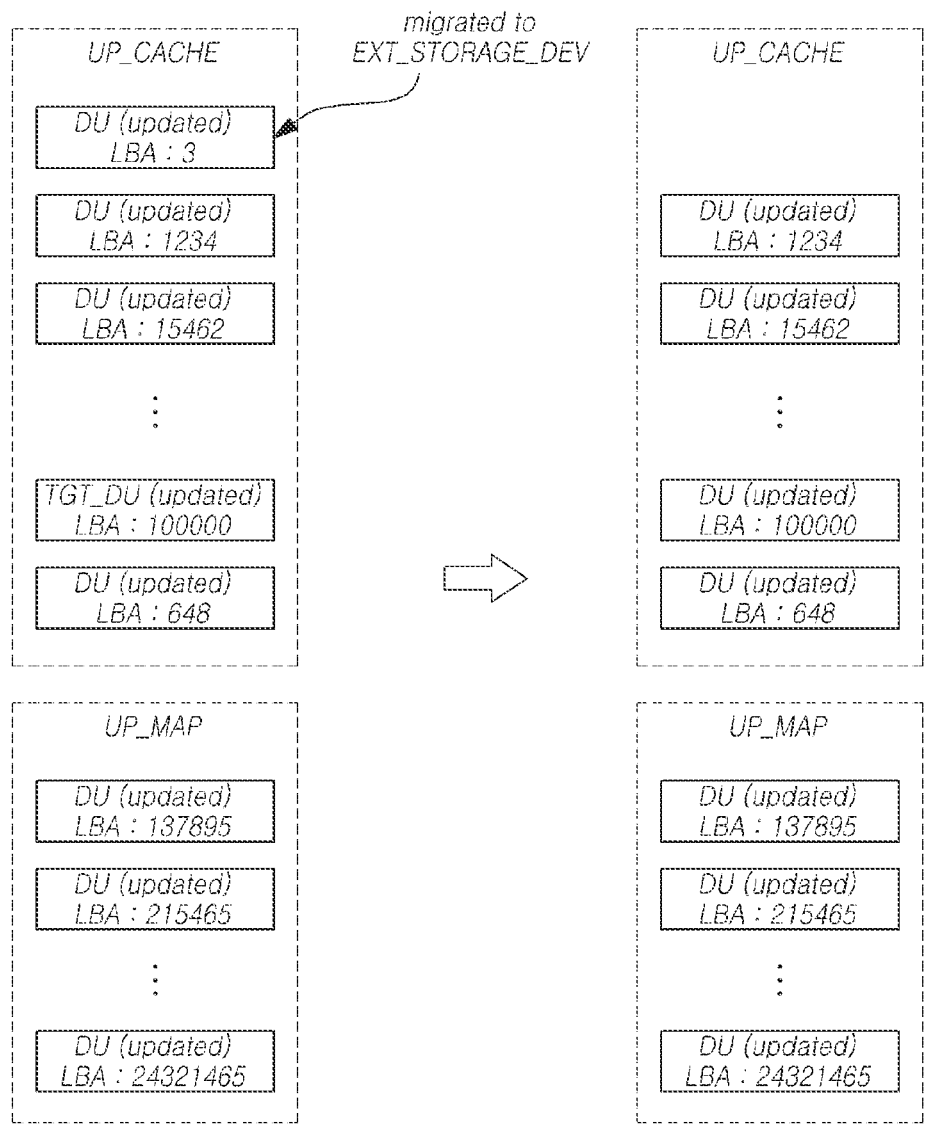
FIGS. 9 to 10 illustrate an operation in which a storage device caches an update data unit again based on an update map according to embodiments of the present disclosure.
Figure 10:
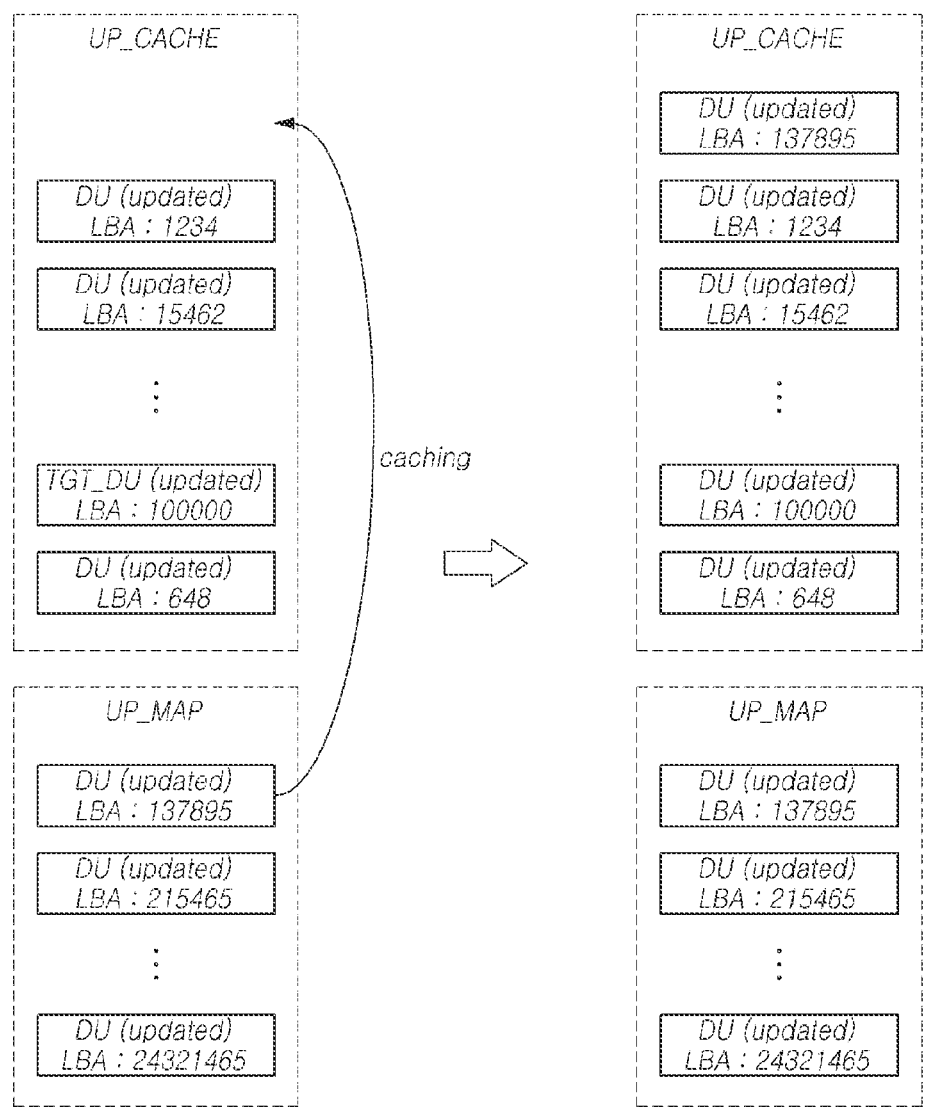

FIGS. 9 to 10 illustrate an operation in which a storage device caches an update data unit again based on an update map according to embodiments of the present disclosure.

Referring to FIG. 9, the controller 120 of the storage device 100 may migrate an update data unit, among the update data units cached in the update cache UP_CACHE, corresponding to logical address 3 to the external storage device EXT_STORAGE_DEV. In this case, a space in which the update data unit corresponding to the logical address 3 is cached may be secured as free space in the update cache UP_CACHE.

Accordingly, the controller 120 may cache a new update data unit in the space where the update data unit corresponding to the logical address 3 was previously cached. In this case, the controller 120 may determine an update data unit to be cached again based on the update map UP_MAP.

In this case, the controller 120 may determine update data units to be cached to the update cache UP_CACHE based on logical addresses corresponding to update data units whose history is recorded in the update map UP_MAP respectively.

For example, the controller 120 may cache the M number of update data units having the smallest value of corresponding logical address, from among the update data units whose history is recorded in the update map UP_MAP, in the update cache UP_CACHE again.

In FIG. 10, among update data units whose history is recorded in the update map UP_MAP, an update data unit having a corresponding logical address value of 137895 is an update data unit corresponding to the smallest logical address.

Accordingly, the controller 120 may cache the update data unit corresponding to the logical address 137895 in the space where the update data unit corresponding to the logical address 3 was previously cached.

Meanwhile, the controller 120 may determine update data units to be cached again in the update cache UP_CACHE in another method.

For example, the controller 120 may cache the M number of update data units having the largest value of corresponding logical address, from among the update data units whose history is recorded in the update map UP_MAP, in the update cache UP_CACHE.

Figure 11:
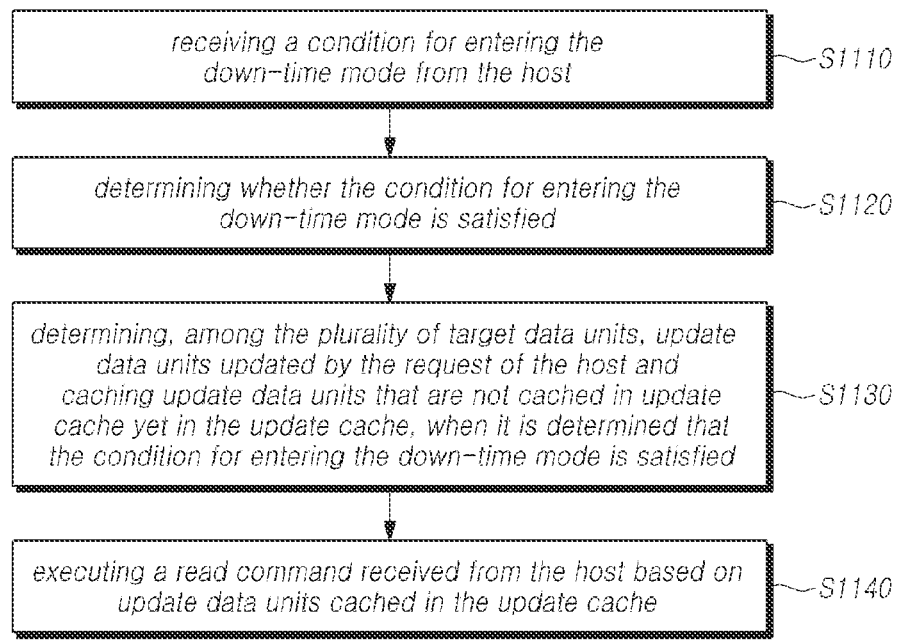
FIG. 11 illustrates an operating method of a storage device according to embodiments of the present disclosure.

FIG. 11 illustrates an operating method of a storage device according to embodiments of the present disclosure.

Referring to FIG. 11, the method for operating the storage device 100 may include receiving, from the host, a condition for entering the down-time mode (S1110).

When the storage device 100 starts an operation of migrating a plurality of target data units among the plurality of data units DU to the external storage device EXT_STOR- AGE_DEV, the condition for entering the down-time mode may be received from the host.

The method for operating the storage device 100 may include determining whether the condition for entering the down-time mode is satisfied (S1120).

For example, the operation S1120 may determine that the condition for entering the down-time mode is satisfied when a number of update data units, among the plurality of target data units, generated during a time period is less than a threshold number THR.

The method for operating the storage device 100 may include determining, among the plurality of target data units, update data units updated by the request of the host and caching update data units that are not yet cached in update cache UP_CACHE in the update cache UP_CACHE, when it is determined that the condition for entering the down-time mode is satisfied (S1130).

For example, the operation S1130 may evicts, from the update cache UP_CACHE, a victim data unit VIC_DU from among the update data units cached in the update cache UP_CACHE while caching, in a state where the update cache is full, update data units TGT_DU that are not cached in the update cache UP_CACHE. The victim data unit VIC_DU may be determined based on logical addresses corresponding to the update data units cached in the update cache UP_CACHE respectively.

For example, the operation S1130 may cache, while migrating the N number of cached data units to the external storage device EXT_STORAGE_DEV, the M number of update data units that are not cached in the update cache UP_CACHE based on an update map UP_MAP storing a history of the update data units. The update data units to be cached to the update cache UP_CACHE may be determined based on logical addresses corresponding to the update data units whose history is recorded in the update map UP_MAP respectively.

The method for operating the storage device 100 may include processing a read command received from the host based on the update data units cached in the update cache UP_CACHE (S1140).

Although various embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of this disclosure is not limited by the embodiments and the accompanying drawings. The spirit and scope of this disclosure should be interpreted in connection with the appended claims and encompass all equivalents falling within the scope of the appended claims. Furthermore, the embodiments may be combined to form additional embodiments.

What is claimed is:

1. A storage device comprising:
   a memory configured to store a plurality of data units; and
   a controller configured to:
   migrate, in response to a request, target data units from the memory to an external device, the target data units being selected from among the stored data units,
   receive, during the migration, a condition for a down-time mode,
   determine update data units, which are updated from among the target data units during the migration,
   cache, during the migration, at least a part of the update data units in an update cache when the condition is determined as satisfied, and
   process, with the cached data units, a read request in the down-time mode.

2. The storage device according to claim 1, wherein the controller is further configured to determine the condition as satisfied when a number of the update data units determined during a time period is less than a threshold number.

3. The storage device according to claim 1, wherein the controller is further configured to evict a victim data unit from the update cache when caching at least a part of the update data units in the update cache that is full of the cached data units.

4. The storage device according to claim 3, wherein the controller is further configured to determine the victim data unit from among the cached data units based on logical addresses of the cached data units.

5. The storage device according to claim 4, wherein the controller determines, as the victim data unit, a cached data unit, of the cached data units, having a greatest logical address from among the logical addresses.

6. The storage device according to claim 4, wherein the controller determines, as the victim data unit, a cached data unit, of the cached data units, having a least logical address from among the logical addresses.

7. The storage device according to claim 3, wherein the controller caches, based on an update map, M number of the update data units during migration of N number of the cached data units,
   wherein the update map includes a history of the update data units, and
   wherein M is less than or equal to N.

8. The storage device according to claim 7, wherein the controller is further configured to determine the M number of the update data units, whose history is recorded in the update map, based on logical addresses of the update data units.

9. The storage device according to claim 8, wherein the controller determines the M number of the update data units having least logical addresses from among the logical addresses.

10. The storage device according to claim 8, wherein the controller determines the M number of the update data units having greatest logical addresses from among the logical addresses.

11. A method for operating a storage device, the method comprising:
    receiving a condition for a down-time mode while migrating target data units from the storage device to an external device, the target data units being selected from among data units stored in the storage device;
    determining whether the condition for the down-time mode is satisfied;
    determining update data units, which are updated from among the target data units in response to a request during the migrating;
    caching at least a part of the update data units in an update cache in response to determining that the condition is satisfied; and
    processing, with the cached data units, a read request in the down-time mode.

12. The method according to claim 11, further comprising determining the condition is satisfied in response to a number of the update data units determined during a time period is less than a threshold number.

13. The method according to claim 11, further comprising evicting a victim data unit from the update cache in response to caching at least a part of the update data units in the update cache that is full of the cached data units.

14. The method according to claim 13, further comprising determining the victim data unit from among the cached data units based on logical addresses of the cached data units.

15. The method according to claim 13, wherein the caching includes caching, based on an update map, M number of the update data units during migrating of N number of the cached data units, wherein the update map includes a history of the update data units, and wherein M is less than or equal to N.

16. The method according to claim 15, further comprising determining the M number of the update data units, whose history is recorded in the update map, based on logical addresses of the update data units.

17. A controller comprising:
a memory interface configured to communicate with a memory configured to store therein a plurality of data units; and
a control circuit configured to:
receive information,
migrate, in response to the information, target data units from the memory to an external device, the target data units being selected from among the stored data units,
cache, in an update cache, at least a part of update data units from among the target data units when a condition for a down-time mode is determined as satisfied according to the information during the migration, and
process, with the cached data units, a read request in the down-time mode.

* * * * *